United States Patent
Surawski

(10) Patent No.: US 9,457,908 B2
(45) Date of Patent: Oct. 4, 2016

(54) SELF-COOLED MOTOR DRIVEN COMPRESSOR

(71) Applicant: Eric Surawski, Wethersfield, CT (US)

(72) Inventor: Eric Surawski, Wethersfield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 797 days.

(21) Appl. No.: 13/623,506

(22) Filed: Sep. 20, 2012

(65) Prior Publication Data

US 2014/0080397 A1    Mar. 20, 2014

(51) Int. Cl.
| | |
|---|---|
| *F04D 25/08* | (2006.01) |
| *B64D 13/04* | (2006.01) |
| *B64D 13/08* | (2006.01) |
| *B64D 37/32* | (2006.01) |
| *B64D 13/06* | (2006.01) |

(52) U.S. Cl.
CPC .............. *B64D 13/08* (2013.01); *B64D 37/32* (2013.01); *B64D 13/06* (2013.01); *B64D 2013/0618* (2013.01); *B64D 2013/0659* (2013.01); *B64D 2013/0677* (2013.01); *B64D 2013/0688* (2013.01); *Y02T 50/56* (2013.01)

(58) Field of Classification Search
CPC .......... Y02T 50/56; B64D 2013/0659; B64D 2013/0618; B64D 13/06; B64D 13/08; B64D 37/32; B64D 2013/0677
USPC ......................................... 137/870; 244/53 B
See application file for complete search history.

(56) References Cited

U.S. PATENT DOCUMENTS

| | | | |
|---|---|---|---|
| 3,645,112 A | 2/1972 | Mount et al. | |
| 3,913,346 A | 10/1975 | Moody, Jr. et al. | |
| 5,222,874 A | 6/1993 | Unnewehr et al. | |
| 6,009,722 A | 1/2000 | Choi et al. | |
| 6,129,524 A | 10/2000 | Woollenweber et al. | |
| 6,189,324 B1 * | 2/2001 | Williams et al. | ............... 62/172 |
| 7,181,928 B2 | 2/2007 | de Larminat | |
| 7,285,882 B2 | 10/2007 | Zhong | |
| 7,342,332 B2 | 3/2008 | McAuliffe et al. | |
| 7,759,828 B2 | 7/2010 | Zhong | |
| 7,828,874 B2 * | 11/2010 | Surawski et al. | .................. 95/14 |
| 8,021,127 B2 | 9/2011 | De Larminat | |
| 2002/0002840 A1 | 1/2002 | Nakane et al. | |
| 2003/0094007 A1 | 5/2003 | Choi et al. | |
| 2005/0284173 A1 | 12/2005 | de Larminat | |
| 2006/0061222 A1 | 3/2006 | McAuliffe et al. | |
| 2006/0067833 A1 | 3/2006 | McAuliffe et al. | |
| 2006/0185514 A1 * | 8/2006 | Schwalm et al. | .................... 96/4 |
| 2006/0255667 A1 | 11/2006 | Zhong | |
| 2007/0158122 A1 * | 7/2007 | Telakowski | .................. 180/68.1 |
| 2007/0212232 A1 | 9/2007 | De Larminat | |
| 2007/0297925 A1 | 12/2007 | Zhong | |
| 2011/0300006 A1 | 12/2011 | Larminat | |
| 2012/0011878 A1 | 1/2012 | Hipsky | |

* cited by examiner

*Primary Examiner* — Steven B McAllister
*Assistant Examiner* — Reginald McNeill, II
(74) *Attorney, Agent, or Firm* — Cantor Colburn LLP

(57) ABSTRACT

An nitrogen generation system for an aircraft is provided. The system includes a RAM air circuit, a motor driven compressor (MDC) having a rotor, a stator to drive rotor rotation and a compressor rotatably coupled to the rotor and a cooling system. The cooling system directs cooling air from the RAM air circuit to an inlet of the compressor and an alternative low pressure environment such that the cooling air removes heat from the stator.

8 Claims, 2 Drawing Sheets

SELF-COOLED MOTOR DRIVEN COMPRESSOR

BACKGROUND OF THE INVENTION

The subject matter disclosed herein relates to compressors and, more particularly, to a self-cooled motor driven compressor (MDC).

Aircrafts generally include various systems for generating inert gas to control fuel tank flammability. These systems include, for example, a nitrogen generation system that serves to generate the inert gas. Typically, such a nitrogen generation system has a motor that is coupled to one or more compressors to remove air from the cabin, to drive the removed air into a heat exchanger and to continue to drive the removed air toward an exhaust system.

BRIEF DESCRIPTION OF THE INVENTION

According to one aspect of the invention, a nitrogen generation system for an aircraft is provided. The system includes a RAM air circuit, a motor driven compressor (MDC) having a rotor, a stator to drive rotor rotation and a compressor rotatably coupled to the rotor and a cooling system. The cooling system directs cooling air from the RAM air circuit to an inlet of the compressor and an alternative low pressure environment such that the cooling air removes heat from the stator.

According to another aspect of the invention, a nitrogen generation system for an aircraft is provided and includes a supply of cooling air, a motor having a rotor and a stator configured to drive rotor rotation, a compressor fluidly disposed between a cabin of the aircraft and a heat exchanger of the aircraft, the compressor having an inlet defined between the cabin and the compressor and being rotatably coupled to the rotor to form a pressure depression at the inlet and a cooling system. The cooling system is disposed to provide a flow of cooling air from the supply of cooling air to the inlet and an alternative low pressure environment such that the cooling air removes heat from the stator.

According to yet another aspect of the invention, a method of operating a nitrogen generation system of an aircraft is provided and includes determining whether cabin air pressure exceeds a pressure of a supply of cooling air, directing cooling air to flow from the supply of cooling air toward an inlet of a motor driven compressor (MDC) in an event the cabin air pressure is similar to the pressure of the supply of cooling air and using the cooling air to remove heat from a stator of the MDC during the directing.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As discussed generally above, aircrafts generally include various systems for generating inert gas. These systems include, for example, a nitrogen generation system that serves to generate inert gas used to produce an inert environment in the fuel tanks. Typically, such a nitrogen generation system has a motor that is coupled to one or more compressors to remove air from the cabin, to drive the removed air into a heat exchanger and to continue to drive the removed air toward an exhaust system. During operation, the motor generates heat and the heat needs to be removed. In one embodiment, a system is provided herein to remove the generated heat.

Figure 1:
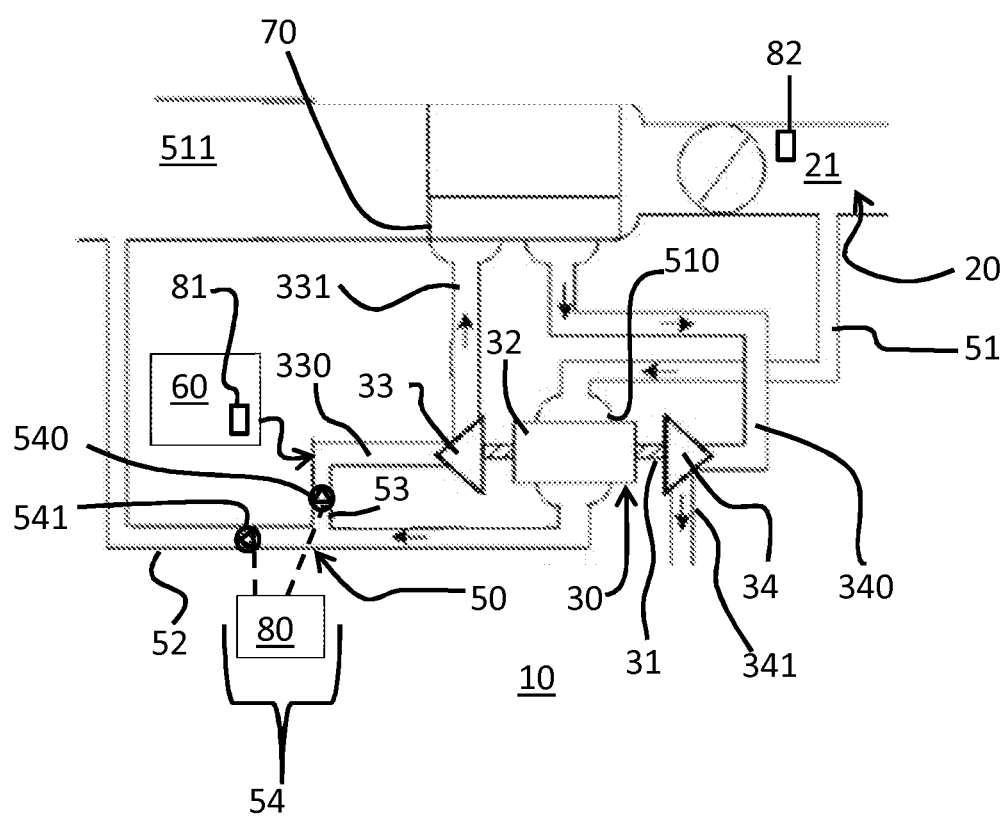
FIG. 1 is a schematic illustration of a nitrogen generation system having a self-cooled motor driven compressor (MDC) in accordance with embodiments.

With reference to FIG. 1, a nitrogen generation system (hereinafter "the system") 10 for an aircraft is provided. The system 10 includes a supply of cooling air 20, which may be embodied as a RAM air circuit 21. For the purposes of clarity and brevity, the phrases "supply of cooling air 20" and RAM air circuit 21 will be used interchangeably. The system 10 further includes a motor driven compressor (MDC) 30 and a cooling system 50.

The MDC 30 includes a rotor 31, a stator 32 a first stage compressor 33 and a second stage compressor 34. The stator 32 may be annular in shape and is formed to define an aperture extending from one axial side thereof to the other axial side thereof. The rotor 31 is rotatably disposed in the aperture. In addition, the stator 32 is configured to support conductive elements (e.g., coils) that are receptive of current to drive rotation of the rotor 31 within the aperture. The reception of this current and the carrying of the current along the conductive elements generates heat within the stator 32 that is removed by the cooling system 50.

The first stage compressor 33 is rotatably coupled to a first end of the rotor 31 and the second stage compressor 34 is rotatably coupled to a second end of the rotor 31. The first and second ends of the rotor 31 may be defined oppositely from one another. With this construction, as the rotor 31 is rotated within the aperture by the conductive elements of the stator 32, the first and second stage compressors 33 and 34 are operated.

The first stage compressor 33 is fluidly disposed between a cabin 60 and a heat exchanger 70 (i.e., an intercooler) of the aircraft. Thus, the first stage compressor 33 has a first inlet 330 that is defined between the cabin 60 and the first stage compressor 33 and a first outlet 331 that is defined between the first stage compressor 33 and the heat exchanger 70. Similarly, the second stage compressor 34 has a second inlet 340 defined between the heat exchanger 70 and the second stage compressor 34 and a second outlet 341 defined downstream from the second stage compressor 34. The heat exchanger 70 is fluidly interposed between the first and second stage compressors 33 and 34 and between an inlet of the RAM air circuit 21 and an aircraft exterior 511, which provides for an alternative low pressure environment.

When the first stage compressor 33 is operated by the rotation of the rotor 31, the first stage compressor 33 generates a pressure depression in the first inlet 330. The cooling system 50 is disposed and configured to provide a flow of cooling air, such as RAM air, from the RAM air circuit 21 to the first inlet 330 or the aircraft exterior 511. In either case, the pressure depression generated by the first stage compressor 33 in the first inlet 330 or the alternative low pressure environment of the aircraft exterior 511 draw the cooling air through the cooling system 50 such that the cooling air contacts with and thereby removes the generated heat from the stator 32. In accordance with embodiments, the cooling system 50 includes a first duct 51, a second duct 52, a third duct 53 and a valve arrangement 54.

The first duct 51 extends from the RAM air circuit 21 to a manifold 510 disposed around the stator 32. The second duct 52 extends from the manifold 510 of the stator 32 to the aircraft exterior 511. The third duct 53 extends from the second duct 52 to the first inlet 330. The valve arrangement 54 is configured to direct the flow of cooling air from the second duct 52 to the third duct 53 and through the third duct 53 to the pressure depression in the first inlet 330 whereby the cooling air is drawn to the pressure depression in the first inlet 330 and removes heat from the stator 32 while passing from the first duct 51 to the second duct 52.

The valve arrangement 54 includes a first valve 540, a second valve 541 and, in some cases, a controller 80. The first valve 540 is disposed along the third duct 53 and is configured to prevent or permit fluid flow along the third duct 53. The second valve 541 is disposed along the second duct 52 at a location defined between the aircraft exterior 511 and the conjunction of the second duct 52 and the third duct 53. The second valve 541 is configured to prevent or permit fluid flow along the second duct 52. The controller 80 is not required for the valve arrangement 54 to operate properly. When used, the controller 80 may be operably coupled to the first and second valves 540 and 541 and configured to open and close the first and second valves 540 and 541 in accordance with predefined (i.e., selected or calculated) scheduling or conditions.

For example, the controller 80 may be configured to receive information relating to a cabin air pressure and a pressure of air in the RAM air circuit 21 from pressure sensors 81 and 82 and to determine whether the cabin air pressure exceeds the pressure of the RAM air in the RAM air circuit 21 based on the received information. The controller 80 may be further configured to open the first valve 540 and to close the second valve 541 when the cabin air pressure and the pressure of the RAM air in the RAM air circuit 21 are similar (i.e., when the aircraft is grounded). By contrast, the controller 80 may be configured to close the first valve 540 and to open the second valve 541 when the cabin air pressure exceeds a pressure of the RAM air in the RAM air circuit 21 (i.e., when the aircraft is in flight and the cabin 60 is pressurized).

As described above, when the controller 80 opens the first valve 540 and closes the second valve 541 when the cabin air pressure and the pressure of the RAM air in the RAM air circuit 21 are similar, the pressure depression in the first inlet 330 draws the flow of the cooling air from the RAM air circuit 21 through the cooling system 50 such that the generated heat is removed from the stator 32. When the controller 80 closes the first valve 540 and opens the second valve 541 when the cabin air pressure exceeds a pressure of the RAM air in the RAM air circuit 21, the low pressure environment of the aircraft exterior 511 draws the flow of the cooling air from the RAM air circuit 21 through the cooling system 50 such that the generated heat is removed from the stator 32.

Figure 2:
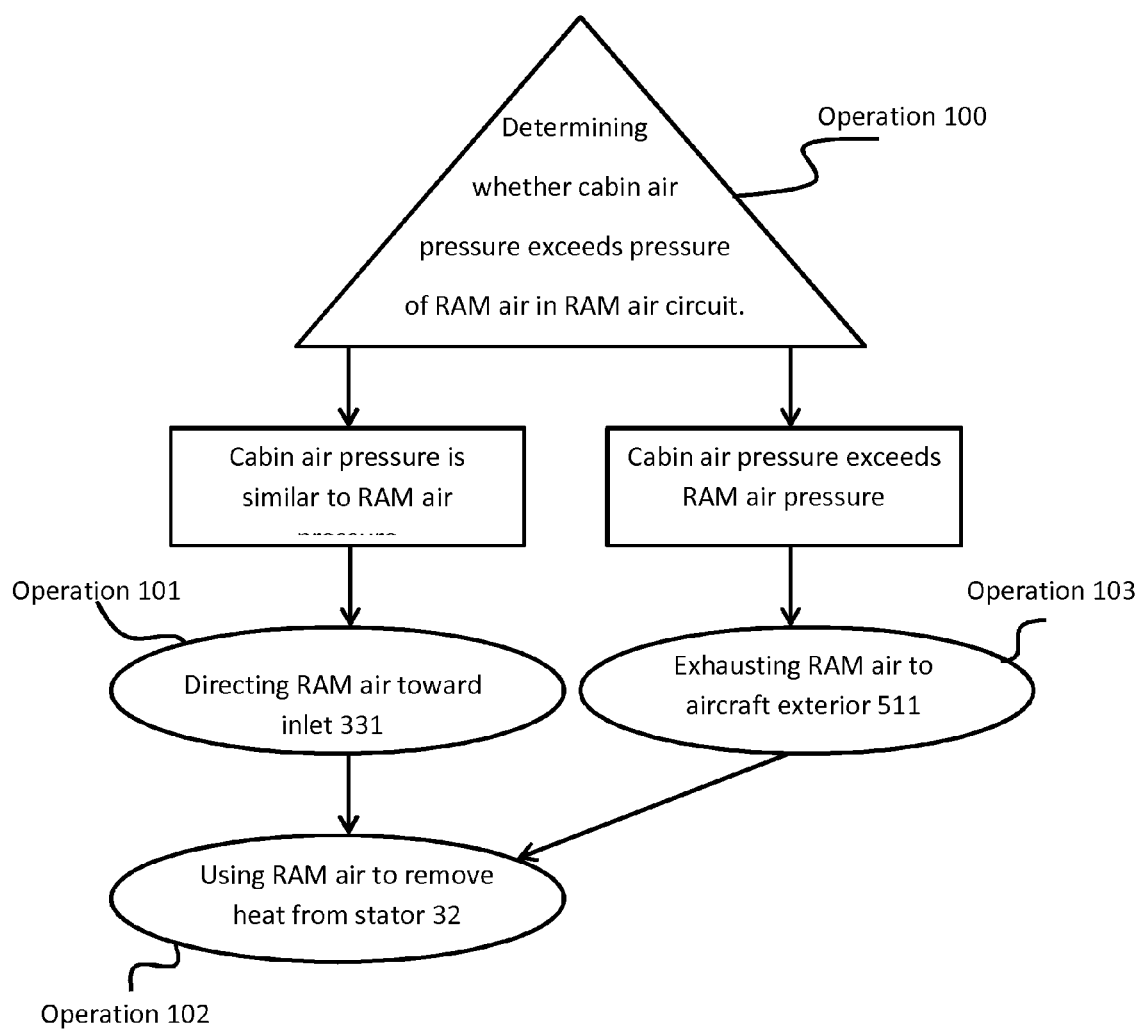
FIG. 2 is a flow diagram illustrating a method of operating the nitrogen generation system of FIG. 1 in accordance with embodiments.

In accordance with further aspects and, with reference to FIG. 2, a method of operating the system 10 described above is provided. As shown in FIG. 2, the method initially includes determining, whether cabin air pressure exceeds a pressure of RAM air in the RAM air circuit 21 (operation 100). The method then includes directing RAM air to flow from the RAM air circuit 21 toward the first inlet 330 in an event the cabin air pressure is similar to the pressure of the air in the RAM air circuit 21 (operation 101) and using the RAM air to remove heat from the stator 32 of the MDC 30 during the directing (operation 102). Alternatively, the method includes exhausting the RAM air from the RAM air circuit 21 toward the aircraft exterior 511 in an event the cabin air pressure exceeds the pressure of the RAM air in the RAM air circuit 21 (operation 103).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A nitrogen generation system for an aircraft, comprising:
   a RAM air circuit;
   a motor driven compressor (MDC) having a rotor, a stator to drive rotor rotation and a compressor rotatably coupled to the rotor; and
   a cooling system to direct cooling air from the RAM air circuit to an inlet of the compressor and an alternative low pressure environment at an aircraft exterior such that the cooling air removes heat from the stator, the cooling system comprising a first duct extending from the RAM air circuit to the stator, a second duct extending from the stator to the aircraft exterior, a third duct extending from the second duct to the inlet and a valve arrangement configured to direct the cooling air from the second duct to the third duct,
   wherein the valve arrangement comprises:
   a first valve disposed along the third duct; and
   a second valve disposed along the second duct, wherein the first valve is opened and the second valve is closed when cabin air pressure and a RAM air circuit pressure are equal, and
   the first valve is closed and the second valve is opened when cabin air pressure exceeds a RAM air circuit pressure.

2. The nitrogen generation system according to claim 1, wherein the compressor is a first stage compressor and further comprising a second stage compressor rotatably coupled to the rotor.

3. The nitrogen generation system according to claim 2, further comprising a heat exchanger fluidly disposed between the first and second stage compressors.

4. The nitrogen generation system according to claim 3, wherein the heat exchanger is fluidly disposed between an inlet of the RAM air circuit and an aircraft exterior.

5. A nitrogen generation system for an aircraft, comprising:
   a supply of cooling air;
   a motor having a rotor and a stator configured to drive rotor rotation;

a compressor fluidly disposed between a cabin of the aircraft and a heat exchanger of the aircraft, the compressor having an inlet defined between the cabin and the compressor and being rotatably coupled to the rotor to form a pressure depression at the inlet; and a cooling system disposed to provide a flow of cooling air from the supply of cooling air to the inlet and an alternative low pressure environment at an aircraft exterior such that the cooling air removes heat from the stator, wherein the cooling system comprises a first duct extending from the supply of cooling air to the stator, a second duct extending from the stator to the aircraft exterior, a third duct extending from the second duct to the inlet and a valve arrangement configured to direct the flow of cooling air from the second duct to the third duct, wherein the valve arrangement comprises:

a first valve disposed along the third duct; and a second valve disposed along the second duct, wherein the first valve is opened and the second valve is closed when cabin air pressure and a pressure of the supply of cooling air are equal, and the first valve is closed and the second valve is opened when cabin air pressure exceeds a pressure of the supply of cooling air.

6. The nitrogen generation system according to claim 5, wherein the compressor is a first stage compressor and further comprising a second stage compressor rotatably coupled to the rotor.

7. The nitrogen generation system according to claim 6, wherein the heat exchanger is fluidly disposed between the first and second stage compressors.

8. The nitrogen generation system according to claim 5, wherein the heat exchanger is fluidly disposed between an inlet of the supply of cooling air and an aircraft exterior.

* * * * *